Feb. 3, 1942.  W. B. BUCHANAN ET AL  2,271,935
VIBRATION DAMPER
Filed Dec. 2, 1938

INVENTORS
William B. Buchanan
Gordon B. Tebo
BY George J. Schotter
ATTORNEY

Patented Feb. 3, 1942

2,271,935

UNITED STATES PATENT OFFICE 2,271,935

VIBRATION DAMPER

William B. Buchanan and Gordon B. Tebo, Toronto, Ontario, Canada, assignors to General Cable Corporation, New York, N. Y., a corporation of New Jersey Application December 2, 1938, Serial No. 243,487
In Canada December 4, 1937

9 Claims. (Cl. 174—42)

This invention relates to means for reducing the amount of vibration occurring in cables in overhead spans. More particularly the invention relates to means for damping standing or traveling mechanical waves set up in suspended cables by the action of wind or air currents. The problem is discussed in our copending application for patent for Torsional damper for line conductors, filed May 6, 1936, Serial No. 78,074, now Patent No. 2,215,541, dated September 24, 1940, which discloses and claims improved vibration dampers. The present application discloses and claims a vibration damper which differs somewhat from those disclosed in our copending application and which has advantages in certain cases.

It is an object of the invention to provide new and improved means for substantially reducing vibration in cables suspended in spans. Other objects and advantages of the invention will appear hereinafter. An illustrative embodiment of the invention selected merely for descriptive purposes is shown in the accompanying drawing in which.

Figure 1:
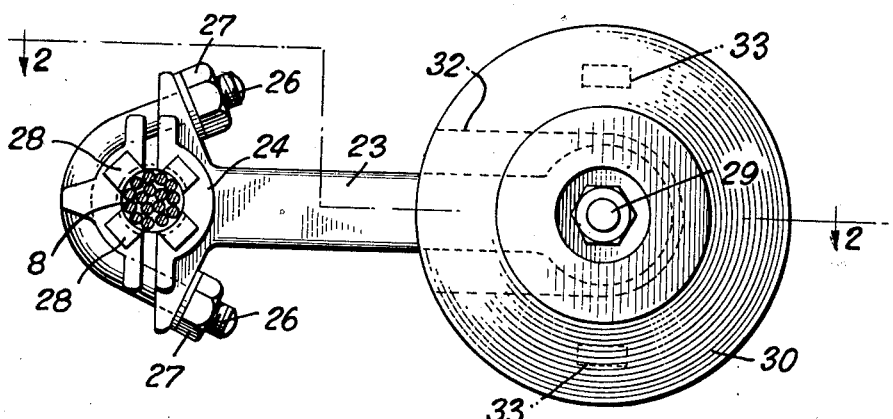
Fig. 1 is a side elevation of the vibration damper secured on a cable.
Figure 2:
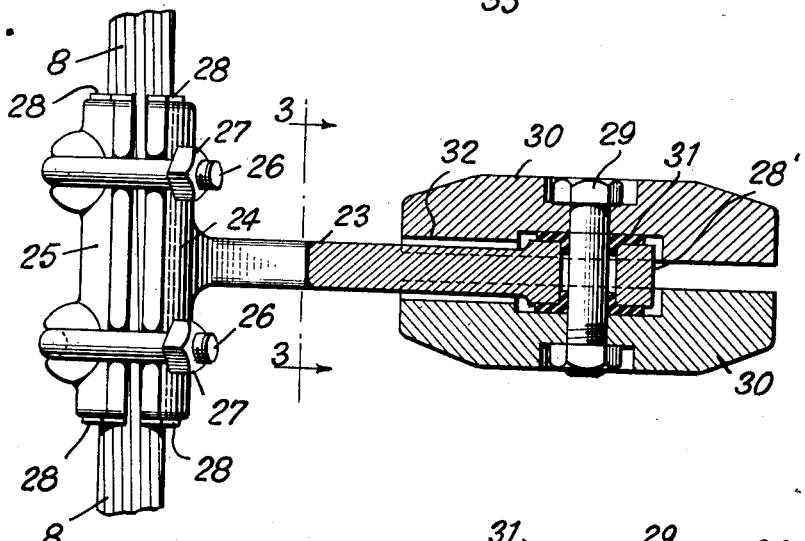
Fig. 2 is a plan view of the damper, partly in section, substantially on the line 2—2 of Fig. 1.
Figure 3:
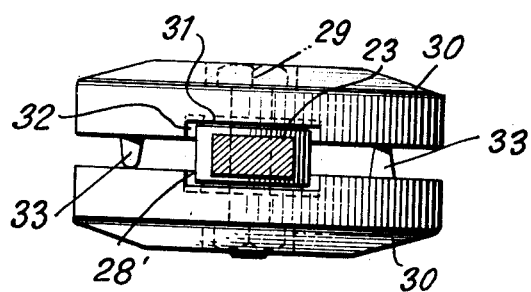
Fig. 3 is a cross-section taken substantially on the line 3—3 of Fig. 2.

Economic pressure in the design of modern transmission lines for transfer of electric energy has tended towards the construction of longer spans, larger sizes of conductors and higher mechanical tensions. These factors, however, singly and collectively have caused unforeseen troubles due to failure of conductors usually at the clamps. Such failures have been carefully studied and it is generally accepted that they are the result of fatigue of the metal and that vibrations caused by the wind tend to set up high concentration and reversals of stress at clamps and other points of reflection. From tests that have been made it would appear that the transient components of stress at such points of reflection may be ten to forty times the corresponding component at any free section in the open.

Analytical study verified by results of extensive tests that we have conducted indicate that if the high concentration of stress at points of reflection could be avoided and the loss of energy uniformly distributed over a length of conductor of say twenty feet or more, the conductor could quite readily absorb much more energy without damage.

It has been generally assumed that a friction loss occurs in a vibrating conductor between strands and between layers. Test results however indicate that at any moderate amplitude such loss is negligible because the normal stringing tension on the conductor results in such pressure between strands as to prevent relative motion until the static friction is overcome by excessive bending. Hence there is in any large size stranded conductor an available energy-absorbing medium of practically unlimited durability, and improved means for utilizing such medium is the object of this invention.

The invention described in our copending application Serial No. 78,074 comprehends a weight or weights sustained on a line conductor in a substantially horizontal position radially thereof so that the mass or masses will constantly exert a restraining torque. This torque induces damping of waves by its effect on interstrand friction. Weights may be applied to opposite sides of the vertical plane through a conductor, the weights being offset longitudinally of the conductor in relation to each other. The forces thus act oppositely to each other at different points on the line conductor.

That invention more specifically proposes, by any suitable system of weights having their centres of gravity laterally eccentric with the axis of the conductor, to convert the energy of either traveling or standing waves on a line conductor into torsional or twisting oscillations which by reason of interstrand friction would be highly damped. For maximum effect certain proportions should exist between the mass of the weights and the mass of conductor and the disposition of the former laterally and longitudinally with the conductor.

In operation, the depending weights function to resist the tendency of the weight supporting members or arms to oscillate vertically with the line conductor and thus set up a force that dissipates wave energy and thereby effectively damps oscillatory motion.

The use of a pivotal coupling between the weights and the weight supporting members as disclosed in our copending application aforesaid tends to reduce stresses at the point of attachment of the weight supporting member on the line conductor, which would otherwise be imposed due to the moment of inertia of the weight.

The present invention provides an energy storing connection between the weight and its supporting member which is preferred under some conditions. Referring to the drawing, there is shown an arm 23 attached to the line conductor 8, for example by means of a split sleeve. One section 24 of the sleeve is integral with the arm and the complemental section 25 conveniently is secured by a pair of U-bolts 26 and nuts 27. Shims 28, for example, soft aluminum, may be interposed in the bore of the sleeve.

The arm 23 extends substantially horizontally from the conductor 8 and terminates in a boss 28' pierced to take the transverse bolt 29 disposed parallel to the conductor axis. Centrally mounted on the bolt is a pair of disk weights 30, 30, one being located on each side of the arm and having a counterbore about the bolt hole in which is seated a resilient washer 31, for example of rubber or rubber-like material.

The inner face of each disc is grooved as at 32 to provide sufficient clearance for swivel movement between the arm and the weights with respect of the articulated connection afforded by the bolt. Parallel ribs 33 disposed on the weights on opposite sides of and equidistant from the centers thereof act as spacers so that the washers 31 may be compressed to the desired degree by the nut 34 on the bolt. Due to there being a slight clearance between the boss hole and the bolt, the washers tend to squeeze in the hole and thus centre the bolt.

Accordingly, this structure mounts the weights in such manner that they are clamped against the washers which resiliently constrain the oscillatory motion of the arm due to inertia of the weights and thus effectively damp wave energy of the line conductor.

While one embodiment of the invention has been described in order to illustrate the principle of the invention, it is to be understood that the invention may be variously modified within the limits of the prior art and the scope of the subjoined claims.

We claim:

1. The combination with a line conductor of the class described, of an arm rigidly mounted thereon in substantially horizontal transverse direction, a weight carried by the arm and having its centre of gravity displaced from the vertical plane containing the axis of the conductor, and an articulated connection, including an axle parallel to the cable axis, between said arm and said weight comprising a resilient energy-storing cushion, said cushion being the only element in contact with both the arm and the weight.

2. The combination with a line conductor of the class described, of an arm rigidly mounted thereon in substantially horizontal transverse direction, weights carried by the distal end of the arm, and an articulated connection, including an axle parallel to the cable axis, attaching the weights to the arm, said connection comprising a weight-supporting member mounted in a body of resilient, energy-storing material which, in turn, is carried by the arm.

3. The combination with a line conductor of the class described, of an arm rigidly mounted thereon in substantially horizontal transverse direction, a pair of weights carried by the distal end of the arm movable about an axis parallel to the cable axis, there being a weight at each side of the arm, a fastening element centrally securing the weights to said arm for turning movement about said axis in planes normal to the axis of the conductor, and a washer of resilient elastic material interposed between each weight and the arm and clamped by said fastening element against side faces thereof so as to store energy by resiliently precluding rotation of the weights, said washers also separating the fastening element from the arm.

4. The combination with a flexible stranded cable suspended at spaced points and subject to vibration, of vibration damping means including an arm rigidly mounted on the cable, a weight mounted on said arm by an articulated joint permitting movement about an axis parallel to the cable axis, the center of gravity of the weight being outside the vertical axial plane of the cable, and resilient energy-storing means interposed between said weight and said arm.

5. The combination with a flexible stranded cable suspended at spaced points and subject to vibration, of vibration damping means including an arm mounted on the cable and a weight mounted on the arm with its center of gravity at one side of the vertical axial plane of the cable to place a constant torsion on the cable, and an articulated joint between the arm and weight permitting movement about an axis parallel to the cable axis, said joint including means to apply torsional resistance to movement between said arm and said weight, said torsional resistance applying means including a resilient energy-storing means interposed between said arm and said weight.

6. The combination with a flexible stranded cable suspended at spaced points and subject to vibration, of vibration damping means including an arm mounted on the cable and a weight mounted on the arm with its center of gravity at one side of the vertical axial plane of the cable to place a constant torsion on the cable, and an articulated joint between the arm and weight permitting movement about an axis parallel to the cable axis, said joint including means to apply torsional resistance to movement between said arm and said weight, said torsional resistance applying means including a resilient energy-storing means interposed between said arm and said weight, said joint providing sufficient clearance between the arm and weight and a connection only through the resilient material whereby movement may also occur in other directions.

7. The combination with a line conductor of the class described, of an arm rigidly mounted thereon in substantially horizontal transverse direction, a weight carried by the arm and having its centre of gravity displaced from the vertical plane containing the axis of the conductor, and an articulated connection therefor incorporating an axle having a resilient energy-storing element between the arm and said weight by which circular movement of the weight is resiliently constrained in a plane normal to the axis of the conductor.

8. The combination with a line conductor of the class described, of a plurality of longitudinally spaced arms rigidly mounted on the conductor in substantially opposite transverse directions, a weight carried by each arm and having its centre of gravity displaced from the vertical plane containing the axis of the conductor, and an articulated connection therefor incorporating an axle having a resilient energy-storing element between the arm and its said weight by which circular movement of the weight is resiliently constrained in a plane normal to the axis of the conductor.

9. The combination with a line conductor of the class described, of an arm rigidly mounted thereon in substantially horizontal transverse direction, weights carried by the distal end of the arm, and an articulated connection attaching the weights to the arm and incorporating an axle having resilient energy-storing means between the arm and said weights such as to resiliently constrain rotative movement of the weights about the axis in a plane normal to the axis of the conductor.

WILLIAM B. BUCHANAN.
GORDON B. TEBO.